UNITED STATES PATENT OFFICE.

FREDERICK WILLIAM MARTINO, OF SHEFFIELD, ENGLAND.

TREATMENT OF ORES CONTAINING PRECIOUS METALS.

SPECIFICATION forming part of Letters Patent No. 716,847, dated December 23, 1902.

Original application filed September 30, 1901, Serial No. 77,139. Divided and this application filed October 7, 1902. Serial No. 126,329. (No specimens.)

*To all whom it may concern:*

Be it known that I, FREDERICK WILLIAM MARTINO, a subject of the King of England, residing in Sheffield, Yorkshire, England, have invented certain new and useful Improvements in or Relating to the Treatment of Ores Containing Noble Metals, (for which I have made application for Letters Patent in Germany under Serial No. 20,870, dated September 26, 1901; in France, dated October 3, 1901; in Russia, dated October 3/16, 1901; in Transvaal, dated October 22, 1901; in Canada, dated October 26, 1901; in British Guiana, dated October 31, 1901; in Natal, dated November 4, 1901; in West Australia, dated November 7, 1901; in Mexico, dated November 8, 1901; in Rhodesia, South Australia, Cape Colony, and Victoria, dated November 12, 1901; in New South Wales and New Zealand, dated November 13, 1901; in Orange River Colony, Queensland, and Tasmania, dated November 14, 1901; in Peru, dated November 18, 1901; in Chile, dated November 25, 1901; in Gold Coast Colony, December 18, 1901; in Great Britain, dated April 24, 1902; in Spain, dated April 26, 1902, and in Portugal, dated April 28, 1902,) of which the following is a specification, this being a division of my application, Serial No. 77,139, filed September 30, 1901.

This invention relates to the treatment of ores containing noble metals mixed with bodies such as tellurium, selenium, sulfur, arsenic, antimony, tin, phosphorus, or the like its object being to provide means for separating the noble metals from such bodies.

In carrying out this invention use is made of a compound whose component parts are barium, sulfur, and carbon and which is hereinafter referred to as "barium sulfo carbid." This compound, barium sulfo carbid, may be made by fusing two parts, by weight, of barium sulfate, (baryta or heavy spar,) $BaSO_4$, in an electric furnace with one part of carbon. The carbon is preferably in the form of charcoal, coke, or anthracite. A current of about two hundred and fifty to three hundred amperes and about one hundred volts is sufficient, the furnace used being similar to those extensively employed in the manufacture of calcium carbid. Barium sulfo carbid when brought into contact with water gives off sulfureted hydrogen, ($H_2S$,) and for this reason is applicable, among other purposes, to the conversion of metals and other bodies into sulfids.

According to this invention ores containing gold or other noble metals mixed with bodies such as tellurium, selenium, sulfur, arsenic, antimony, tin, phosphorus, or the like are ground and heated in a reducing (muffle) furnace with powdered barium sulfo carbid, the result being that the bodies above mentioned are converted into soluble sulfids, in which condition they may be removed by washing the mixture with water. In this process the gold or other noble metals remain unaffected and may be extracted by any desired means. If dissolved out by bromid or cyanid or chlorid solutions in the case of gold or cyanid or nitrate solutions in the case of silver, they may be precipitated therefrom by either adding barium sulfo carbid to the solution or by first treating some barium sulfo carbid with water (preferably acidified) and then leading the gas evolved into the solution. In both cases the gold or other precious metals will be precipitated as sulfids. When dealing with cyanid extractions, the solutions should be kept acid, preferably by the employment of hydrochloric acid.

What I claim, and desire to secure by Letters Patent, is—

1. The process of separating the noble metals from ores containing tellurium, selenium, sulfur, arsenic, antimony, tin, phosphorus or the like consisting in heating the mixture with barium sulfo carbid and then treating it with water.

2. The process of separating gold from ores containing tellurium, selenium, sulfur, arsenic, antimony, tin, phosphorus or the like, consisting in grinding the mixture, heating it with powdered barium sulfo carbid in a reducing (muffle) furnace and then dissolving out the soluble sulfids thus formed.

3. The process of separating gold from ores containing tellurium, selenium, sulfur, arsenic, antimony, tin, phosphorus or the like consisting in grinding the mixture heating it with powdered barium sulfo carbid in a reducing (muffle) furnace dissolving out the soluble sulfids thus formed treating the solid residue with a gold solvent and precipitating the gold therefrom by the employment of barium sulfo carbid.

In testimony whereof I have signed my name to this specification in the presence of two subscribing witnesses.

FREDERICK WILLIAM MARTINO.

Witnesses:
LUTHUR J. PARR,
ARTHUR H. LOCEWOOD.